United States Patent
Chen et al.

(10) Patent No.: US 12,342,264 B2
(45) Date of Patent: Jun. 24, 2025

(54) METHOD AND APPARATUS FOR TRANSMIT PARAMETER INDICATION IN SUPPORT OF WLAN SENSING

(71) Applicant: Intel Corporation, Santa Clara, CA (US)

(72) Inventors: Cheng Chen, Portland, OR (US); Carlos Cordeiro, Portland, OR (US); Claudio Da Silva, Portland, OR (US); Bahareh Sadeghi, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 853 days.

(21) Appl. No.: 17/206,172

(22) Filed: Mar. 19, 2021

(65) Prior Publication Data

US 2021/0211973 A1 Jul. 8, 2021

(51) Int. Cl.
*H04W 48/16* (2009.01)
*H04W 84/12* (2009.01)

(52) U.S. Cl.
CPC ............ *H04W 48/16* (2013.01); *H04W 84/12* (2013.01)

(58) Field of Classification Search
CPC .............................. H04W 76/10; H04W 84/12
USPC .................................. 455/450; 370/252, 445
See application file for complete search history.

(56) References Cited

U.S. PATENT DOCUMENTS

| | | | | |
|---|---|---|---|---|
| 2008/0096501 | A1* | 4/2008 | Salomone | H04W 48/16 455/434 |
| 2014/0192642 | A1* | 7/2014 | Medapalli | H04W 28/02 370/230 |
| 2019/0052407 | A1* | 2/2019 | Son | H04L 5/0053 |
| 2020/0305231 | A1* | 9/2020 | Sadeghi | H04W 12/30 |
| 2020/0359248 | A1 | 11/2020 | Sadeghi et al. | |
| 2021/0410225 | A1* | 12/2021 | Sood | H04L 69/22 |
| 2023/0199842 | A1* | 6/2023 | Lopez | H04L 5/0094 370/329 |
| 2023/0403589 | A1* | 12/2023 | Dong | H04W 24/10 |

OTHER PUBLICATIONS

The extended European search report for European Application No. 22151986.1, dated Nov. 25, 2022, 21 pages.
Cheng Chen (Intel): "Overview of Wi-Fi sensing protocol", IEEE Draft; 11-20-1851-04-00bf-overview-of-wi-fi-sensing-protocol, IEEE-SA Mentor, Piscataway, NJ USA vol. 802.11 bf, No. 4, dated Mar. 9, 2021, 12 pages.

(Continued)

*Primary Examiner* — Kiet M Doan
(74) *Attorney, Agent, or Firm* — East IP P.C.

(57) ABSTRACT

Provided herein is a method and apparatus for transmit parameter indication in support of Wireless Local Area Network (WLAN) sensing. The disclosure provides an apparatus, comprising: a Radio Frequency (RF) interface; and processor circuitry coupled with the RF interface, wherein the processor circuitry is to: decode an Information Element (IE) received from a WLAN device via the RF interface, wherein the IE is to indicate a transmit parameter for a transmission of a Physical layer Protocol Data Unit (PPDU) of the WLAN device; and perform WLAN sensing on the WLAN device based on the IE. Other embodiments may also be disclosed and claimed.

14 Claims, 12 Drawing Sheets

(56) References Cited

OTHER PUBLICATIONS

Insun Jang (LG Electronics): "Discussion on WLAN Sensing Roles", IEEE DRAFT;11-20-1805-01-00 bf-discussion-on-wlan-sensing-roles,IEEE SA Mentor, Piscataway, NJ, USA, vol. 802.1 1bf, No. 1, dated Dec. 8, 2020, 11 pages.

Rui Du (Huawei):"Definitions and scenarios of the WLAN sensing", IEEE Draft; Nov. 21, 00 35-00-00 Bf-definitions-and-scenarios-of-the-wlan-sensing, IEEE-SA Mentor, Piscataway, NJ USA, vol. 802.11bf,dated Jan. 11, 2021, 20 pages.

Cheng Chen (Intel):"Wi-Fi Sensing Definitions",IEEE Draft; 11-20-1849-04-00bf-wi-fi-sensing-definitions, IEEE-SA Mentor, Piscataway, NJ USA, vol. 802.11bf, No. 4, dated Jan. 13, 2021,15 pages.

Dongguk Lim (LGE): "Use Cases for Wireless LAN Sensing", IEEE Draft; 11-20-1239-00-sens-use-cases-for-wireless-lan-sensing, IEEE-SA Mentor, Piscataway,NJ USA vo1. 802.11 SENS, dated Aug. 17, 2020, 11 pages.

Insun Jang (LG Electronics) :"Discussion on WLAN Sensing Procedure",IEEE Draft;11-20-1804-01-00bf-discussion-on-wlan-sensing-procedure, IEEE-SA Mentor, Piscataway,NJ USA vol. 802.11bf, No. 1 dated Mar. 8, 2021, 13 pages.

Cheng Chen (Intel):"Considerations of sensing negotiation", IEEE Draft;11-21-0370-01-00bf-considerations-of-sensing-negotiation, IEEE-SA Mentor,Piscataway, NJ USAvol. 802.11bf, No. 1, dated Mar. 15, 2021,10 pages.

Claudio Da Silva (Intel):"A Channel Measurement Procedure for WLAN Sensing", IEEE Draft;11-20-0842-00-sens-a-channel-measurement-procedure-for-wlan-sensing, IEEE SA Mentor,Piscataway, NJ USAvol.802.11 SENS, dated Jun. 5, 2020,14 pages.

The First Office Action for JP Application No. 2022-023353, dated Mar. 4, 2025, 6 pages.

Cheng Chen (Intel), Overview of WLAN sensing protocol, IEEE 802.11-20/1232r0, IEEE mentor, dated Aug. 16, 2020, 12 Pages.

Cheng Chen (Intel), WLAN Sensing Definitions, IEEE 802.11-20/0807r0, IEEE mento, dated May 25, 2020, 13 Pages.

Rojan Chitrakar (Panasonic), CRs for WUR Discovery, IEEE 802.11-18/1882r0 , IEEE mentor, dated Nov. 12, 2018, 8 Pages.

\* cited by examiner

201

| Element ID | Length | Element ID Extension | PHY 1 | PHY 2 | ... | PHY n |
|---|---|---|---|---|---|---|

Octets:   1   1   1

| Element ID | Length | Element ID Extension | Parameter bitmap | PHY 1 | PHY 2 | ... | PHY n |
|---|---|---|---|---|---|---|---|

Octets:   1   1   1   fixed

| Category | Action | PHY 1 | PHY 2 | ... | PHY *n* |
|---|---|---|---|---|---|

Octets: 1 1

| Category | Action | WLAN sensing element |
|---|---|---|

Octets: 1 1

FIG. 3b

METHOD AND APPARATUS FOR TRANSMIT PARAMETER INDICATION IN SUPPORT OF WLAN SENSING

TECHNICAL FIELD

Embodiments of the present disclosure generally relate to wireless communication, and in particular, to a method and apparatus for transmit parameter indication in support of Wireless Local Area Network (WLAN) sensing.

BACKGROUND

WLAN sensing is typically used to characterize the environment in which a WLAN device is located. WLAN sensing would be impacted by various facts. For example, it would be impacted by a movement of a person, for example, in the environment. Moreover, some other facts may be studied to enhance the performance of the WLAN sensing.

BRIEF DESCRIPTION OF THE DRAWINGS

Embodiments of the disclosure will be illustrated, by way of example and not limitation, in conjunction with the figures of the accompanying drawings in which like reference numerals refer to similar elements and wherein:

FIG. 2a is a schematic diagram of an exemplary WLAN sensing element in accordance with some embodiments of the disclosure.

FIG. 2b is a schematic diagram of an exemplary WLAN sensing element in accordance with some embodiments of the disclosure.

FIG. 3a is a schematic diagram of an exemplary WLAN sensing frame in accordance with some embodiments of the disclosure.

FIG. 3b is a schematic diagram of an exemplary WLAN sensing frame in accordance with some embodiments of the disclosure.

DETAILED DESCRIPTION

Various aspects of the illustrative embodiments will be described using terms commonly employed by those skilled in the art to convey the substance of the disclosure to others skilled in the art. However, it will be apparent to those skilled in the art that many alternate embodiments may be practiced using portions of the described aspects. For purposes of explanation, specific numbers, materials, and configurations are set forth in order to provide a thorough understanding of the illustrative embodiments. However, it will be apparent to those skilled in the art that alternate embodiments may be practiced without the specific details. In other instances, well known features may have been omitted or simplified in order to avoid obscuring the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrases "in an embodiment" "in one embodiment" and "in some embodiments" are used repeatedly herein. The phrase generally does not refer to the same embodiment; however, it may. The terms "comprising," "having," and "including" are synonymous, unless the context dictates otherwise. The phrases "A or B" and "A/B" mean "(A), (B), or (A and B)."

Figure 1:
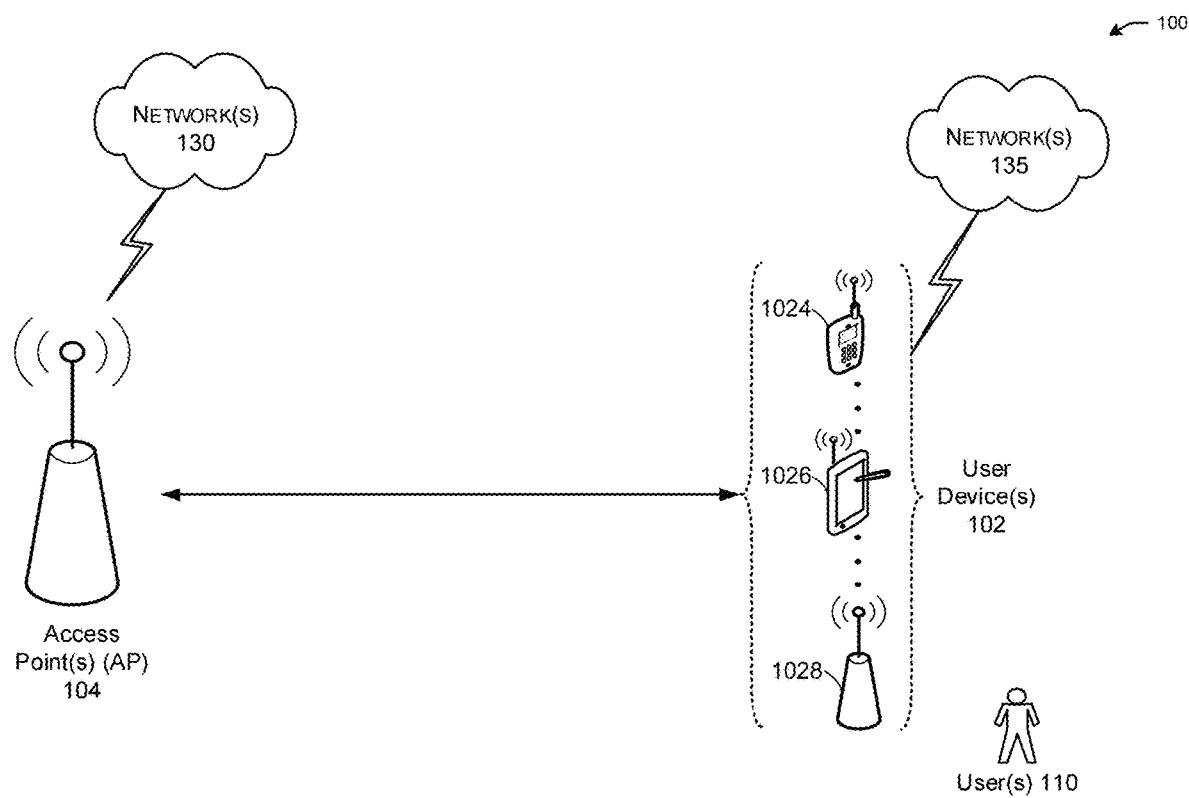
FIG. 1 is a network diagram illustrating an example network environment according to some embodiments of the disclosure.

FIG. 1 is a network diagram illustrating an example network environment according to some embodiments of the disclosure. As shown in FIG. 1, a wireless network 100 may include one or more user devices 102 and one or more access points (APs) 104, which may communicate in accordance with IEEE 802.11 communication standards. The user devices 102 may be mobile devices that are non-stationary (e.g., not having fixed locations) or may be stationary devices.

Figure 11:
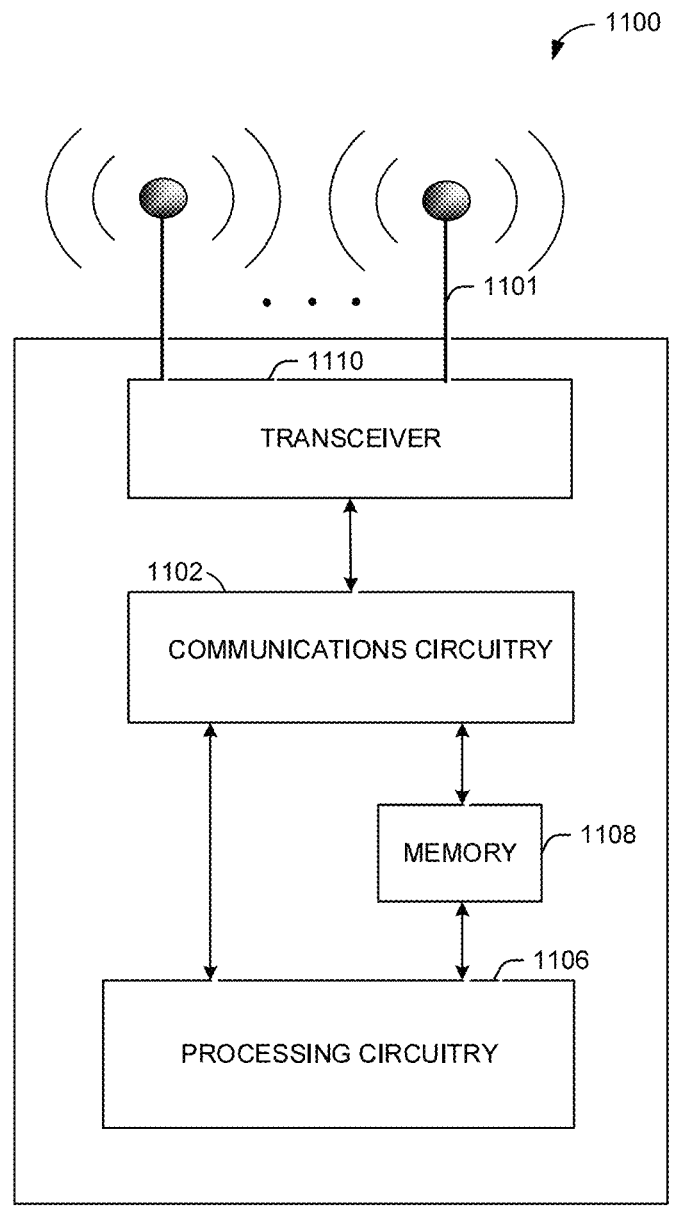
FIG. 11 is a functional diagram of an exemplary communication station in accordance with one or more example embodiments of the disclosure.
Figure 12:
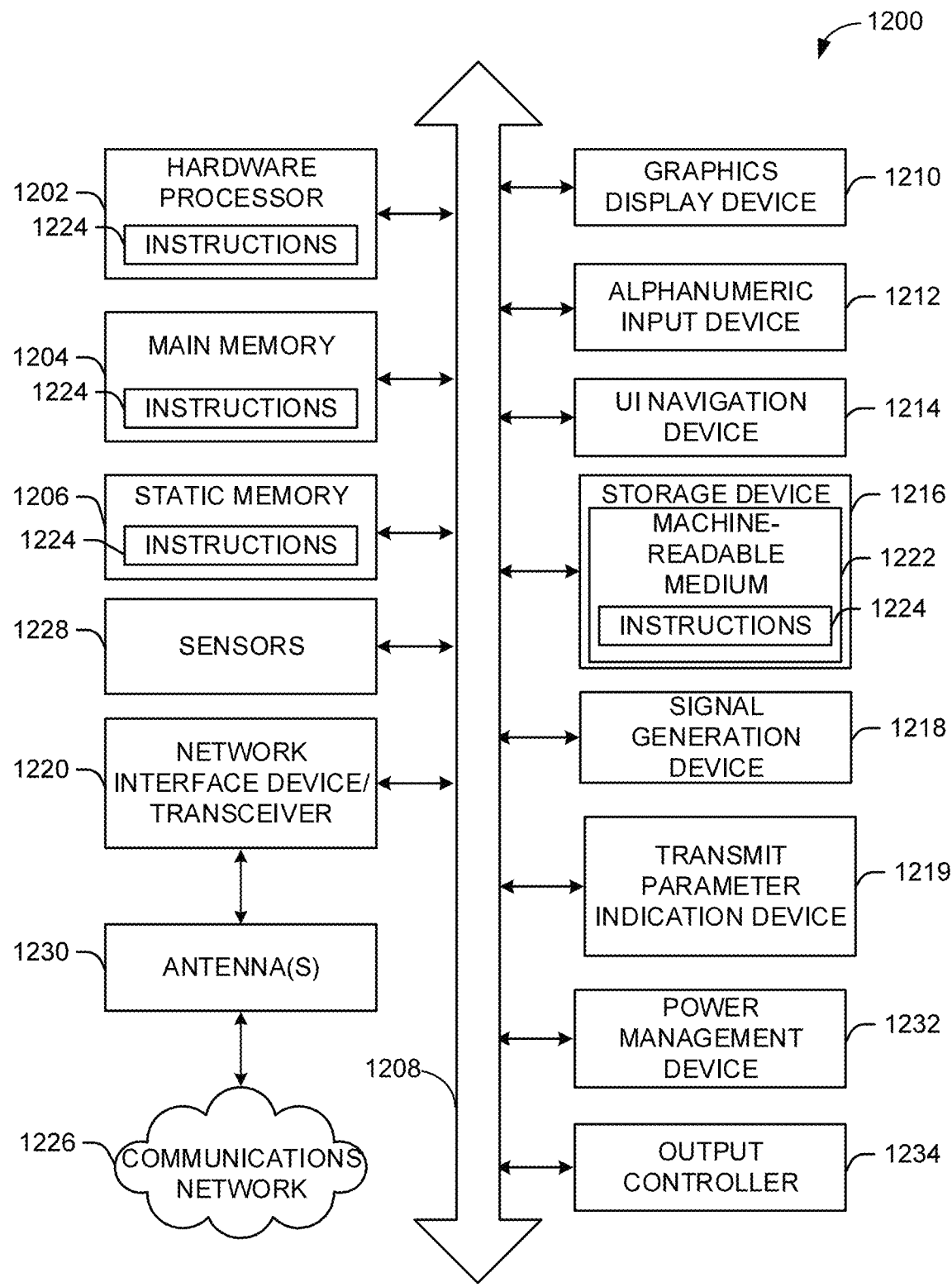
FIG. 12 is a block diagram of an example of a machine or system upon which any one or more of the techniques (e.g., methodologies) discussed herein may be performed.

In some embodiments, the user devices 102 and APs 104 may include one or more function modules similar to those in the functional diagram of FIG. 11 and/or the example machine/system of FIG. 12.

The one or more user devices 102 and/or APs 104 may be operable by one or more users 110. It should be noted that any addressable unit may be a station (STA). A STA may take on multiple distinct characteristics, each of which shape its function. For example, a single addressable unit might simultaneously be a portable STA, a quality-of-service (QoS) STA, a dependent STA, and a hidden STA. The one or more user devices 102 and the one or more APs 104 may be STAs. The one or more user devices 102 and/or APs 104 may operate as a personal basic service set (PBSS) control point/access point (PCP/AP). The user devices 102 (e.g., 1024, 1026, or 1028) and/or APs 104 may include any suitable processor-driven device including, but not limited to, a mobile device or a non-mobile, e.g., a static device. For example, the user devices 102 and/or APs 104 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a personal digital assistant (PDA) device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a personal communications service (PCS) device, a PDA device which incorporates a wireless communication device, a mobile or portable global positioning system (GPS) device, a digital video broadcasting (DVB) device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user devices 102 and/or APs 104 may also include mesh stations in, for example, a mesh network, in accordance with one or more IEEE 802.11 standards and/or 3GPP standards.

Any of the user devices 102 (e.g., user devices 1024, 1026, 1028) and APs 104 may be configured to communicate with each other via one or more communications networks 130 and/or 135 wirelessly or wired. The user devices 102 may also communicate peer-to-peer or directly with each other with or without APs 104. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user devices 102 (e.g., user devices 1024, 1026, 1028) and APs 104 may include one or more communications antennas. The one or more communications antennas may be any suitable type of antennas corresponding to the communications protocols used by the user devices 102 (e.g., user devices 1024, 1026 and 1028) and APs 104. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 102 and/or APs 104.

Any of the user devices 102 (e.g., user devices 1024, 1026, 1028) and APs 104 may be configured to perform directional transmission and/or directional reception in conjunction with wirelessly communicating in a wireless network. Any of the user devices 102 (e.g., user devices 1024, 1026, 1028) and APs 104 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user devices 102 (e.g., user devices 1024, 1026, 1028) and APs 104 may be configured to perform any given directional transmission towards one or more defined transmit sectors. Any of the user devices 102 (e.g., user devices 1024, 1026, 1028) and APs 104 may be configured to perform any given directional reception from one or more defined receive sectors.

MIMO beamforming in a wireless network may be accomplished using radio frequency (RF) beamforming and/or digital beamforming. In some embodiments, in performing a given MIMO transmission, the user devices 102 and/or APs 104 may be configured to use all or a subset of its one or more communications antennas to perform MIMO beamforming.

Any of the user devices 102 (e.g., user devices 1024, 1026, 1028) and APs 104 may include any suitable radio and/or transceiver for transmitting and/or receiving radio frequency (RF) signals in the bandwidth and/or channels corresponding to the communications protocols utilized by any of the user devices 102 and APs 104 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

Embodiments are provided to indicate a transmit parameter(s) in support of WLAN sensing so as to enhance the performance of the WLAN sensing.

Wi-Fi sensing is a Wi-Fi technology to perform sensor- and radar-like applications such as:
  Motion detection: Detect environmental changes between devices including those resultant from the motion of a person;
  Remote patient monitoring: Passively monitor patient movements, including fall detection and other movement alerts;
  Passive localization: Determine the location of a human, animal, or object that does not carry a wireless device in a pre-mapped/scanned/trained location;
  Livelihood detection: Discriminate inanimate objects from animate objects through the detection of vital signs and fine movement;
  Vital signs monitoring: Contactless estimation of breathing rate and/or heart rate.

Wi-Fi sensing implementations typically includes two categories:
  Same device transmits and receives a waveform—like conventional radars (e.g., Frequency Modulated Continuous Wave (FMCW) technology). It is usually implemented using mmWave technology (IEEE 802.11ad/ay) and Doppler processing. Typically it is used for short-range, high-resolution applications such as gesture recognition and vital signs monitoring;
  Sensing is performed by tracking one or more wireless links between one "sensing" STA (e.g., an AP) and one or more transmitting STAs (clients, for example). It is typically implemented using sub-7 (e.g., 2.4/5/6) GHz Wi-Fi technology and makes use of artificial intelligence (AI)/machine learning (ML) algorithms to classify time-variations in the wireless channels into events/activities. It supports wide coverage (e.g., single-family home) and lower-resolution applications such as home security and smart buildings.

WLAN sensing implementations typically rely on solutions that (1) force STAs participating in WLAN sensing to hold/freeze their transmit parameters and/or (2) enable STAs participating in WLAN sensing to indicate relevant transmit parameters through a back-channel. Such WLAN sensing implementations may experience performance degradation whenever one or more of the STAs that participate in the sensing procedure change transmit parameters, for example, changes in transmit power level, beamforming matrix, and antenna/antenna set used, as there is no definition and procedure that enables STAs participating in WLAN sensing to indicate transmit parameters and adaptation.

The disclosure is mainly described based on WLAN sensing applications that rely on tracking one or more wireless links over time (e.g., the second category described above). Such applications rely on the fact that as a person or object moves around a given environment, which may impact how a Wi-Fi signal propagates from a transmitter to a receiver (e.g., propagation paths are created and destructed thereby generating time-varying multipath fading). However, the solutions in the disclosure may be applicable in other WLAN sensing applications (e.g., sensing applications that rely on Doppler processing). The disclosure is not limited in this respect.

It is expected that channel estimates of a wireless link will over time show no or little time variation when the environment is static, and show variation when the environment is not static, such as when a person walks in the environment being monitored. However, these expected behaviors rely on the assumption that sensing transmitters do not change their transmit parameters when sending packets used for WLAN sensing purposes. However, most Wi-Fi devices do adapt their transmit parameters over time for a number of reasons—and this fact, if not appropriately dealt with, may severely degrade the performance of WLAN sensing. For example, different transmit parameter sets may result in very different channel estimates.

The possible performance loss experienced by WLAN sensing as a result of transmit parameter adaptations occurs because sensing receivers do not typically have knowledge of when (and which) such changes happen. Thus, sensing receivers are not able to discriminate whether observed changes happened as a result of changes in the channel (such as when a person walks in an environment)—which is a goal of Wi-Fi sensing—or as a result of transmit parameter changes/adaptations.

For easy of description, a sensing transmitter is a STA that transmits Physical layer Protocol Data Units (PPDU)s used for sensing measurements in a sensing session, and a sensing receiver is a STA that receives PPDUs sent by a sensing transmitter and performs sensing measurements in a sensing session. If a sensing receiver has knowledge of the transmit parameters used in the transmission of each PPDU it receives, it would be able to not only determine when adaptations occur but also possibly be able to eliminate or reduce the impact of such adaptations.

To inform STAs performing WLAN sensing (e.g., a sensing receiver) of transmit parameters used in the transmission of a PPDU, a new information element (IE) may be defined to carry such information. The new information element may be referred as to a WLAN sensing element. The transmit parameters may include Physical layer (PHY) parameters.

FIG. 2a is a schematic diagram of an exemplary WLAN sensing element 201 in accordance with some embodiments of the disclosure. In FIG. 2a, the fields labelled PHY 1, PHY 2, . . . and PHY n of the WLAN sensing element 201 correspond to various PHY parameters, such as TX power level, that are not found in the PPDU's PHY header.

In some embodiments, as shown in FIG. 2a, the WLAN sensing element 201 may further include other fields, for example, Element ID, Length, and Element ID Extension.

FIG. 2b is a schematic diagram of an exemplary WLAN sensing element 202 in accordance with some embodiments of the disclosure. The WLAN sensing element 202 of FIG. 2b illustrates a second possible format of the proposed information element.

Compared with the WLAN sensing element 201 of FIG. 2a, the WLAN sensing element 202 includes an additional field before the PHY 1, PHY 2 . . . PHY n fields, which is shown as field "Parameter bitmap" in FIG. 2b. Through the field "Parameter bitmap", the PHY parameters that are included in the information element can be determined via a bitmap. In some embodiments, the length of this field would be fixed and indicate, by using 0s and 1s, the parameter values contained in the element. For example, the first bit in the bitmap could indicate transmit (TX) power level, the second one could indicate antenna set used, and so on. In this case, if the first bit in the bitmap is equal to 1, PHY 1 would contain the TX power used in the transmission of the PPDU. If the first bit in the bitmap is equal to 0 and the second bit in the bitmap is equal to 1, PHY 1 would indicate the antenna set used in the transmission of the PPDU. In some embodiments, the length of each PHY field may be predefined or configured by signaling.

In some embodiments, the proposed WLAN sensing element (e.g., the WLAN sensing element 201 and the WLAN sensing element 202) could be extended to include more fields than the ones used for the transmission of PHY parameters, such as addresses, time duration of the current WLAN sensing session, and indication of a request to extend a WLAN sensing session, among others. That is, in addition to PHY parameter information, additional fields could be defined within the WLAN sensing element to carry information related to the sensing session and/or application.

In some embodiments, the proposed information element could be used in other procedures beyond WLAN sensing. In this case, the information element may be referred as to "transmit parameter element" and the format may be extensible.

In some embodiments, the WLAN sensing element could be carried within an existing management frame such as a Beacon frame. This would allow, for example, a sensing receiver to track Beacon frames periodically broadcasted by an AP to support WLAN sensing. Alternatively, in some embodiments, a new management frame could be defined to carry the WLAN sensing element, as described below.

In some embodiments, the Action type of the new management frame may be No Ack. For example, the new management frame may be referred as to WLAN sensing frame. Similarly as previously discussed, the new management frame may be referred as to transmit parameter frame to report transmit parameters in addition to usage of WLAN sensing.

FIG. 3a is a schematic diagram of an exemplary WLAN sensing frame 301 in accordance with some embodiments of the disclosure. As shown in FIG. 3a, the WLAN sensing frame 301 may include a field "Category", a field "Action" as well as fields "PHY 1", "PHY 2" . . . "PHY n" that indicate transmit parameters used for WLAN sensing.

FIG. 3b is a schematic diagram of an exemplary WLAN sensing frame 302 in accordance with some embodiments of the disclosure. The WLAN sensing frame 302 of FIG. 3b illustrates a second possible format of the proposed new management frame. As shown in FIG. 3b, the WLAN sensing element disclosed is included in the WLAN sensing frame 302.

Similar to the WLAN sensing element above, in addition to PHY parameter information, in some embodiments, additional fields could be defined within the WLAN sensing frames 301 and 302 to carry information related to the sensing session and/or application.

Below, information contained in the WLAN sensing element/frame will be detailed.

As mentioned above, the various fields (PHY 1, PHY 2, . . . and PHY n) in the WLAN sensing element/frame may correspond to PHY parameters not found in the PPDU's PHY header.

In some embodiments, the "PHY parameters" may include TXVECTOR values used in the generation of the PPDU.

For example, for high-throughput (HT), very-high throughput (VHT), high-efficiency (HE), and Extremely high throughput (EHT) PPDUs, these fields may indicate one or more of the following TXVECTOR parameters:
  TXPWR_LEVEL_INDEX: indicates which of the available TxPowerLevel attributes defined in Master Information Block (MIB) is used for the current transmission;
  N_TX: indicates the number of transmit chains;
  ANTENNA_SET: indicates which antennas of the available antennas are used in the transmission.

Other PHY parameters could also be defined when the disclosed WLAN sensing element and/or WLAN sensing frame are carried within HT, VHT, HE, or EHT PPDUs. The disclosure is not limited in this respect.

For Directional Multi-Gigabit (DMG) and Enhanced Directional Multi-Gigabit (EDMG) PPDUs, these fields may indicate one or more of the following TXVECTOR parameters:
  ANT_CONFIG: indicates which antenna configuration(s) is to be used throughout the transmission of the packet, and when to switch between configurations;
  TX_SECTOR_CONFIG_INDEX: an integer to identify the TX sector combination index;
  CSD_APPLIED: indicates that Cyclic Shift Delay (CSD) is applied over different transmit chains.

Other PHY parameters may also be defined when the proposed WLAN sensing element and/or WLAN sensing frame are carried within DMG and EDMG PPDUs. The disclosure is not limited in this respect.

These fields within the WLAN sensing element/frame may also include indication of PHY parameters that are implementation-specific and not passed to the PHY through a TXVECTOR. For example, in the generation of HT, VHT, HE, and EHT PPDUs, the transmitter may use a spatial mapping matrix $Q_k$ that maps space-time streams to transmit chains. The matrix $Q_k$ is determined by the PHY, in an implementation-specific manner, and is not controlled by a TXVECTOR parameter. As a result, STAs may use different spatial mapping matrices in the transmission of each PPDU. Therefore, a PHY field within the WLAN sensing element/frame could be defined with one of the possible following definitions:

Indication by a single bit. A bit equal to 1 could indicate, for example, that the matrix $Q_k$ used in the transmission of the PPDU is identical to the same one used in the last transmission to the same user or set of users. If the bit is equal to 0, it may indicate a change in the matrix $Q_k$.

Indication by multiple bits. It would indicate a matrix $Q_k$ configuration used throughout the transmission of the packet, and when to switch between configurations. While the mapping between the index and matrix $Q_k$ is unknown to the receiving STA, it would still allow the receiving STA to track changes to $Q_k$ and possibly even allow it to "combine" PPDUs transmitted with the same configuration over time.

In some embodiments, in order to enable sensing receivers to recognize that a certain PPDU may be used for WLAN sensing purposes—for instance, if the PPDU includes a WLAN sensing element within it—an indication may be included in a PHY header to indicate the presence of a WLAN sensing element/frame. The indication may trigger, for example, the use of a different channel estimation algorithm or the receiver to store the obtained channel estimate until the decoding of the WLAN sensing element/frame, among other implementation issues.

In some embodiments, for HT PPDUs, the indication could be included within HT-SIG; for VHT PPDUs, the indication could be included within VHT-SIG-A; for HE PPDUs, the indication could be included within HE-SIG-A; for DMG PPDUs, the indication could be included within the Header; and for EDMG PPDUs, the indication could be included within the EDMG-Header-A. In some embodiments, the indication could be included within different field from the above. The disclosure is not limited in this respect.

It is beneficial to add little or no load to WLAN from WLAN sensing. As such, whenever possible (depending on requirements of the sensing application, for example), WLAN sensing could make use of PPDUs that are transmitted for other purposes than WLAN sensing—for example, for the transmission of data frames.

In some embodiments, when a sensing application makes use of PPDUs transmitted for different purposes, it is important for the one or more sensing receivers to still be able to obtain the information contained in the WLAN sensing element/frame. As such, when transmitting a PPDU that has an Aggregation MAC Protocol Data Unit (A-MPDU) or, more generally, when transmitting a frame that could be aggregated with other MAC Protocol Data Units (MPDUs), a sensing transmitter may aggregate the WLAN sensing element/frame so that a sensing receiver could obtain knowledge of the PHY parameters used in their transmission.

In some embodiments, a sensing transmitter would make a best effort to aggregate a WLAN sensing element/frame as one of the MPDUs in each of the PPDUs it transmits, particularly if it has knowledge that the PPDU could be used in support of WLAN sensing. This process would effectively reduce the overhead of WLAN sensing as it would enable PPDUs transmitted for data exchange, for example, to also be used by WLAN sensing.

Figure 4:
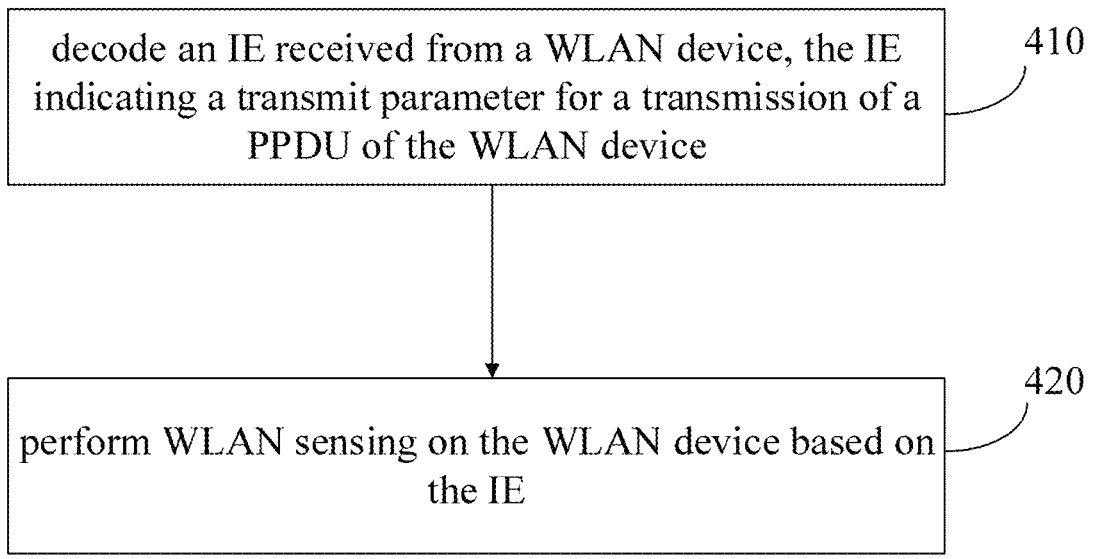
FIG. 4 is a flowchart of a method for transmit parameter indication in support of WLAN sensing in accordance with some embodiments of the disclosure.

FIG. 4 is a flowchart of a method 400 for transmit parameter indication in support of WLAN sensing in accordance with some embodiments of the disclosure. The method 400 may include steps 410 and 420.

At 410, an Information Element (IE) received from a WLAN is decoded. The IE is to indicate a transmit parameter for a transmission of a PPDU of the WLAN device.

At 420, WLAN sensing is performed on the WLAN device based on the IE.

The method 400 may include more or less steps, which is not limited in the disclosure.

In some embodiments, the IE is carried in an existing management frame or a dedicated management frame.

In some embodiments, based on the IE, when the transmit parameter of the WLAN device changes is determined; and when it is determined that the transmit parameter of the WLAN device changes, the WLAN sensing based on the changed transmit parameter.

In some embodiments, the transmit parameter includes a PHY parameter. In some embodiments, the PHY parameter includes a TXVECTOR value. In some embodiments, the PHY parameter is to indicate: a transmit power level; a number of transmit chains; an antenna used for the transmission; an antenna configuration used for the transmission; a transmit sector combination index; or an application of CSD. In some embodiments, the PHY parameter includes an implementation specific parameter.

In some embodiments, the IE is included in the PPDU, and the PPDU includes a PHY header to indicate that the IE is included in the PPDU.

In some embodiments, the IE is further to indicate other information related to the WLAN sensing.

Figure 5:
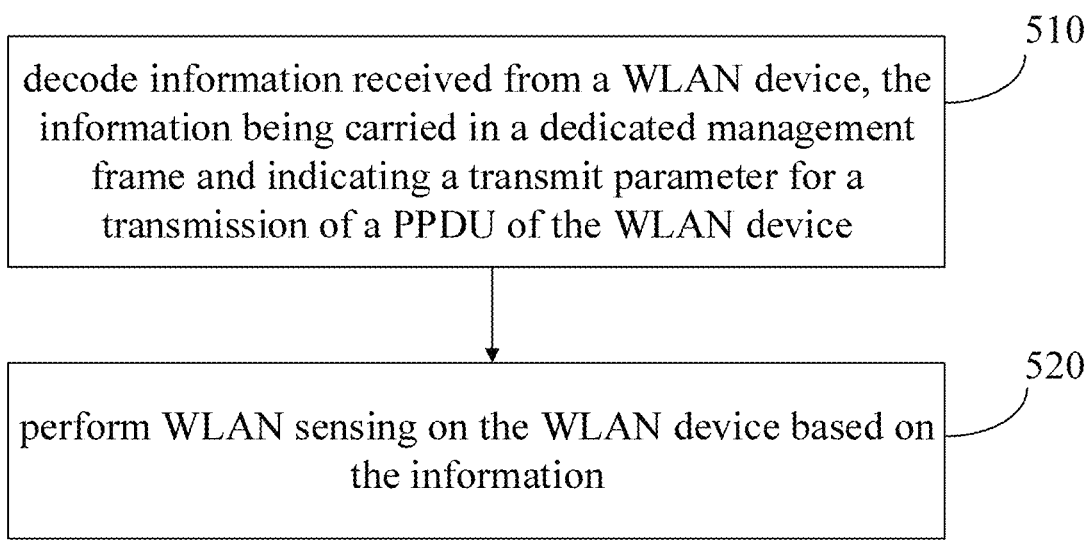
FIG. 5 is a flowchart of a method for transmit parameter indication in support of WLAN sensing in accordance with some embodiments of the disclosure.

FIG. 5 is a flowchart of a method 500 for transmit parameter indication in support of WLAN sensing in accordance with some embodiments of the disclosure. The method 500 may include steps 510 and 520.

At 510, information received from a WLAN device is decoded. The information is carried in a dedicated management frame and to indicate a transmit parameter for a transmission of a PPDU of the WLAN device.

At 520, WLAN sensing is performed on the WLAN device based on the information.

The method 500 may include more or less steps, which is not limited in the disclosure.

In some embodiments, the PPDU includes the dedicated management frame as a MPDU of the PPDU.

Within the broad category of WLAN sensing applications that rely on tracking wireless links over time, there are at least two possible modes of operation: negotiated operation and opportunistic/passive operation.

In the negotiated operation, the STAs that participate in a sensing session may negotiate parameters of operation. While the PPDUs transmitted in support of WLAN sensing may also carry data, their transmission is primarily triggered for WLAN sensing purposes.

In the opportunistic/passive operation, the STAs make WLAN sensing measurements in an opportunistic/passive manner; that is, measurements are made by using PPDUs transmitted for non-sensing purposes. The transmitter of such PPDUs may or may not be aware that the PPDUs it transmits are used for WLAN sensing purposes. In this mode of operation, the overhead (channel usage) of WLAN sensing is negligible or even zero.

Transmit parameter adaptations may negatively impact the performance of both negotiated and opportunistic/passive WLAN sensing. While PPDUs used for channel measurement in negotiated WLAN sensing applications will naturally either (1) be transmitted with no or little transmit parameter changes or (2) include the WLAN sensing element/frame above, PPDUs used by opportunistic WLAN sensing applications will likely be sent with various transmit parameters and will thus require the use of the WLAN sensing element/frame here disclosed.

To enhance the performance of opportunistic/passive WLAN sensing applications, a procedure is provided to enable sensing receivers (or the initiator of a sensing session) to request potential sensing transmitters to include the proposed WLAN sensing element/frame whenever possible in their transmissions.

In some embodiments, the proposed procedure is as follows:
1. A STA that supports opportunistic/passive sensing and the new information element and/or frame disclosed herein, respectively, indicates such support in its capabilities.
2. A STA that intends to perform opportunistic/passive sensing determines if other STAS in its coverage area support the capability discussed in step 1.
   If the STA intending to perform opportunistic/passive sensing is a non-AP STA, it can determine if the desired capability is supported by AP STAs in its vicinity through the transmission of probe requests, among other possible approaches.
   A non-AP STA may determine if other non-AP STAs associated with the same AP support the desired capability through Tunneled Direct Link Setup (TDLS), among other possible approaches.
   A non-AP STA may determine if other non-AP STAs that are unassociated or associated with a different AP support the desired capability by making use of GAS frames/procedure, among other possible approaches.
3. After identifying one or more STA in its coverage area that supports the capability in step 1, a STA that intends to perform WLAN sensing opportunistically sends a WLAN sensing opportunistic request frame to the identified STAs. The following information may be defined in the request:
   Time duration. The STA that receives the request may include the WLAN sensing frame whenever possible in the PPDUs to be transmitted for the time duration defined in the request.
   Desired PHY parameters, such as bandwidth and number of antennas.
   Desired number of PPDU transmissions per second. To enable the WLAN sensing application meet certain reliability/performance levels, the STA sending the request may ask for a minimum number of transmissions in a given period of time.
4. The STA that receives the WLAN sensing opportunistic request frame may either decline the request or accept it.
5. If the STA that receives the request accepts it, this STA will include the WLAN sensing element or the WLAN sensing frame in the PPDUs to be transmitted for the negotiated time duration if there is a change in the transmit parameters (and optionally otherwise).

The operation order of the procedure above is not limited to the above example. The operations of the procedure above may be reordered in some embodiments. The disclosure is not limited in this respect.

In some embodiments of the disclosure, the WLAN sensing element or the WLAN sensing frame may be provisioned for each PPDU, regardless of whether there is a change in the transmit parameters. In some embodiments of the disclosure, the WLAN sensing element or the WLAN sensing frame may be provisioned for a PPDU only when there is a change in the transmit parameters. The disclosure is not limited in this respect.

Figure 6:
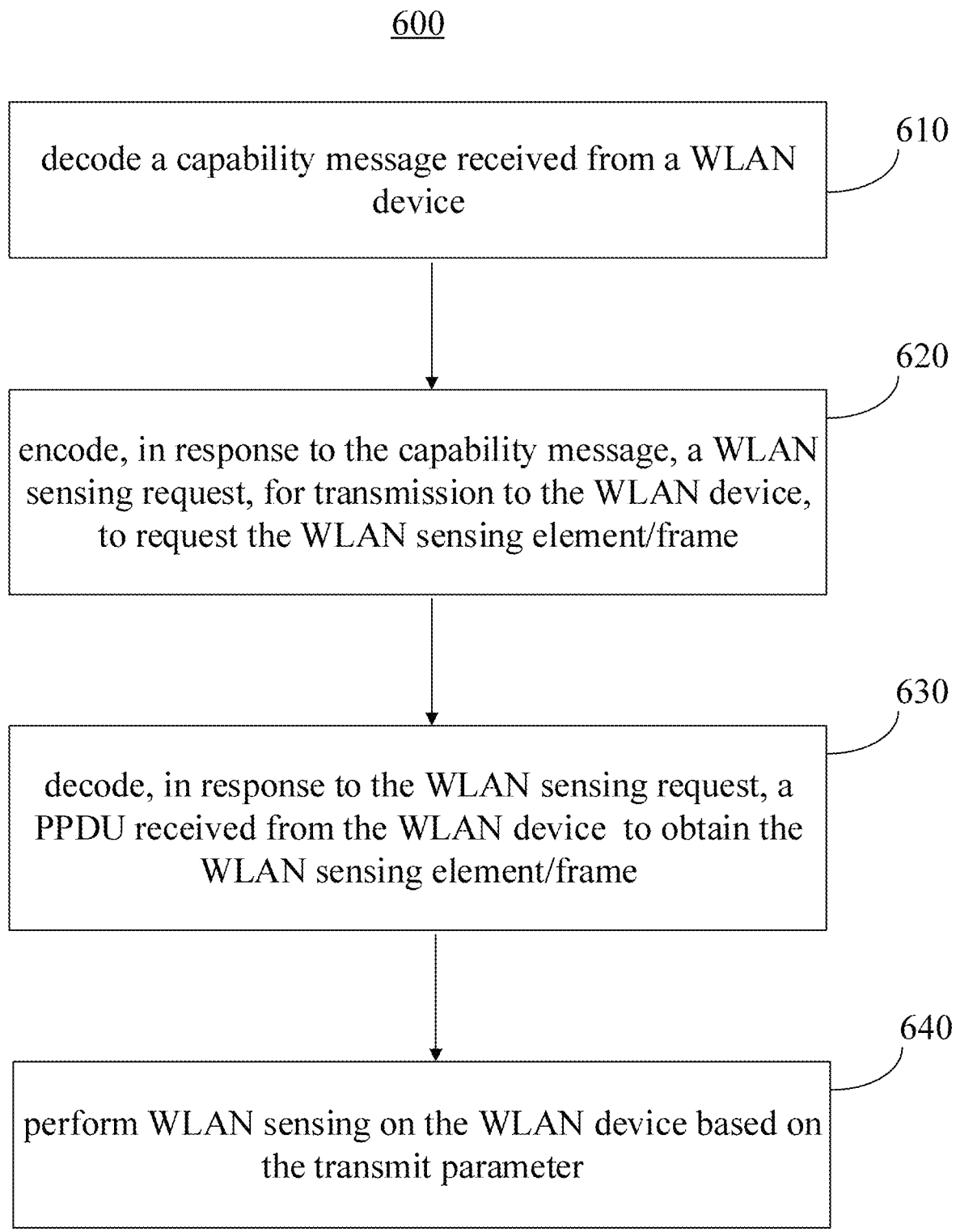
FIG. 6 is a flowchart of a method for transmit parameter indication in support of WLAN sensing in accordance with some embodiments of the disclosure.

FIG. 6 is a flowchart of a method 600 for transmit parameter indication in support of WLAN sensing in accordance with some embodiments of the disclosure. The method 600 may include steps 610, 620, 630 and 640.

At 610, a capability message received from a WLAN device is decoded. The capability message is to indicate that the WLAN device supports both of opportunistic/passive sensing and transmission of a WLAN sensing element/frame.

At 620, in response to the capability message, a WLAN sensing request is encoded, for transmission to the WLAN device, to request the WLAN sensing element/frame.

At 630, in response to the WLAN sensing request, a PPDU received from the WLAN device is decoded to obtain the WLAN sensing element/frame. The WLAN sensing element/frame is to indicate a transmit parameter of the WLAN device for the PPDU.

At 640, WLAN sensing is performed on the WLAN device based on the transmit parameter.

The method 600 may include more or less steps, which is not limited in the disclosure.

In some embodiments, a non-AP STA may perform the method 600.

In some embodiments, the WLAN device may include an AP STA or a non-AP STA.

With the solutions of transmit parameter indication in support of WLAN sensing, a sensing receiver may have knowledge of the transmit parameters used in the transmission of a PPDU it receives. In this way, the sensing receiver may be able to not only determine when adaptations by the sensing transmitter occur but also possibly be able to eliminate or reduce the impact of such adaptations. As a result, the performance of WLAN sensing can be improved.

Figure 7:
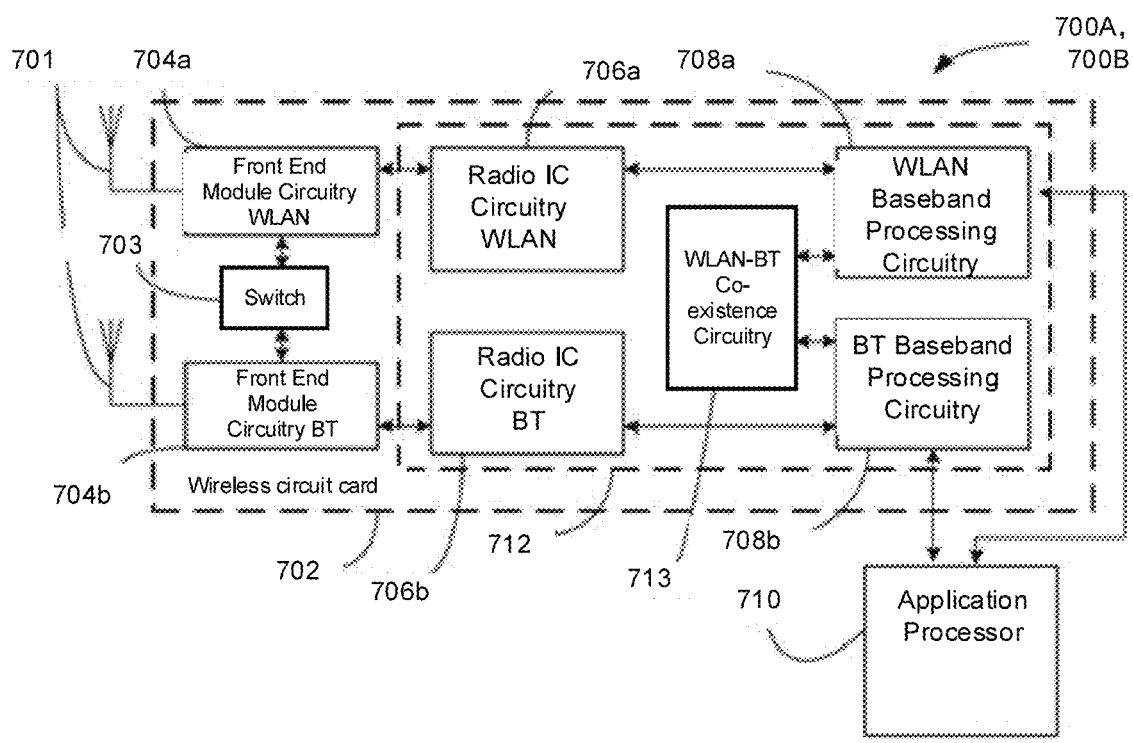
FIG. 7 is a block diagram of a radio architecture 700A, 700B in accordance with some embodiments that may be implemented in any one of APs 104 and/or the user devices 102 of FIG. 1.

FIG. 7 is a block diagram of a radio architecture 700A, 700B in accordance with some embodiments that may be implemented in any one of APs 104 and/or the user devices 102 of FIG. 1. Radio architecture 700A, 700B may include radio front-end module (FEM) circuitry 704a-b, radio IC circuitry 706a-b and baseband processing circuitry 708a-b. Radio architecture 700A, 700B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 704a-b may include a WLAN or Wi-Fi FEM circuitry 704a and a Bluetooth (BT) FEM circuitry 704b. The WLAN FEM circuitry 704a may include a receive signal path comprising circuitry configured to operate on WLAN RF signals received from one or more antennas 701, to amplify the received signals and to provide the amplified versions of the received signals to the WLAN radio IC circuitry 706a for further processing. The BT FEM circuitry 704b may include a receive signal path which may include circuitry configured to operate on BT RF signals received from one or more antennas 701, to amplify the received signals and to provide the amplified versions of the received signals to the BT radio IC circuitry 706b for further processing. FEM circuitry 704a may also include a transmit signal path which may include circuitry configured to amplify WLAN signals provided by the radio IC circuitry 706a for wireless transmission by one or more of the antennas 701. In addition, FEM circuitry 704b may also include a transmit signal path which may include circuitry configured to amplify BT signals provided by the radio IC circuitry 706b for wireless transmission by the one or more antennas. In the embodiment of FIG. 7, although FEM 704a and FEM 704b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 706a-b as shown may include WLAN radio IC circuitry 706a and BT radio IC circuitry 706b. The WLAN radio IC circuitry 706a may include a receive signal path which may include circuitry to down-convert WLAN RF signals received from the FEM circuitry 704a and provide baseband signals to WLAN baseband processing circuitry 708a. BT radio IC circuitry 706b may in turn include a receive signal path which may include circuitry to down-convert BT RF signals received from the FEM circuitry 704b and provide baseband signals to BT baseband processing circuitry 708b. WLAN radio IC circuitry 706a may also include a transmit signal path which may include circuitry to up-convert WLAN baseband signals provided by the WLAN baseband processing circuitry 708a and provide WLAN RF output signals to the FEM circuitry 704a for subsequent wireless transmission by the one or more antennas 701. BT radio IC circuitry 706b may also include a transmit signal path which may include circuitry to up-convert BT baseband signals provided by the BT baseband processing circuitry 708b and provide BT RF output signals to the FEM circuitry 704b for subsequent wireless transmission by the one or more antennas 701. In the embodiment of FIG. 7, although radio IC circuitries 706a and 706b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 708a-b may include a WLAN baseband processing circuitry 708a and a BT baseband processing circuitry 708b. The WLAN baseband processing circuitry 708a may include a memory, such as, for example, a set of RAM arrays in a Fast Fourier Transform or Inverse Fast Fourier Transform block (not shown) of the WLAN baseband processing circuitry 708a. Each of the WLAN baseband circuitry 708a and the BT baseband circuitry 708b may further include one or more processors and control logic to process the signals received from the corresponding WLAN or BT receive signal path of the radio IC circuitry 706a-b, and to also generate corresponding WLAN or BT baseband signals for the transmit signal path of the radio IC circuitry 706a-b. Each of the baseband processing circuitries 708a and 708b may further include physical layer (PHY) and medium access control layer (MAC) circuitry, and may further interface with a device for generation and processing of the baseband signals and for controlling operations of the radio IC circuitry 706a-b.

Referring still to FIG. 7, according to the shown embodiment, WLAN-BT coexistence circuitry 713 may include logic providing an interface between the WLAN baseband circuitry 708a and the BT baseband circuitry 708b to enable use cases requiring WLAN and BT coexistence. In addition, a switch 703 may be provided between the WLAN FEM circuitry 704a and the BT FEM circuitry 704b to allow switching between the WLAN and BT radios according to application needs. In addition, although the antennas 701 are depicted as being respectively connected to the WLAN FEM circuitry 704a and the BT FEM circuitry 704b, embodiments include within their scope the sharing of one or more antennas as between the WLAN and BT FEMs, or the provision of more than one antenna connected to each of FEM 704a or 704b.

In some embodiments, the front-end module circuitry 704a-b, the radio IC circuitry 706a-b, and baseband processing circuitry 708a-b may be provided on a single radio card, such as wireless radio card 702. In some other embodiments, the one or more antennas 701, the FEM circuitry 704a-b and the radio IC circuitry 706a-b may be provided on a single radio card. In some other embodiments, the radio IC circuitry 706a-b and the baseband processing circuitry 708a-b may be provided on a single chip or integrated circuit (IC), such as IC 712.

In some embodiments, the wireless radio card 702 may include a WLAN radio card and may be configured for Wi-Fi communications, although the scope of the embodiments is not limited in this respect. In some of these embodiments, the radio architecture 700A, 700B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 700A, 700B may be part of a Wi-Fi communication station (STA) such as a wireless access point (AP), a base station or a mobile device including a Wi-Fi device. In some of these embodiments, radio architecture 700A, 700B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 700A, 700B may also be suitable to transmit and/or receive communications in accordance with other techniques and standards.

In some embodiments, the radio architecture 700A, 700B may be configured for high-efficiency Wi-Fi (HEW) communications in accordance with the IEEE 802.11ax standard. In these embodiments, the radio architecture 700A, 700B may be configured to communicate in accordance with an OFDMA technique, although the scope of the embodiments is not limited in this respect.

In some other embodiments, the radio architecture 700A, 700B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 7, the BT baseband circuitry 708b may be compliant with a Bluetooth (BT) connectivity standard such as Bluetooth, Bluetooth 8.0 or Bluetooth 6.0, or any other iteration of the Bluetooth Standard.

In some embodiments, the radio architecture 700A, 700B may include other radio cards, such as a cellular radio card configured for cellular (e.g., 5GPP such as LTE, LTE-Advanced or 5G communications).

In some IEEE 802.11 embodiments, the radio architecture 700A, 700B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 720 MHz channel bandwidth may be used. The scope of the embodiments is not limited with respect to the above center frequencies however.

Figure 8:
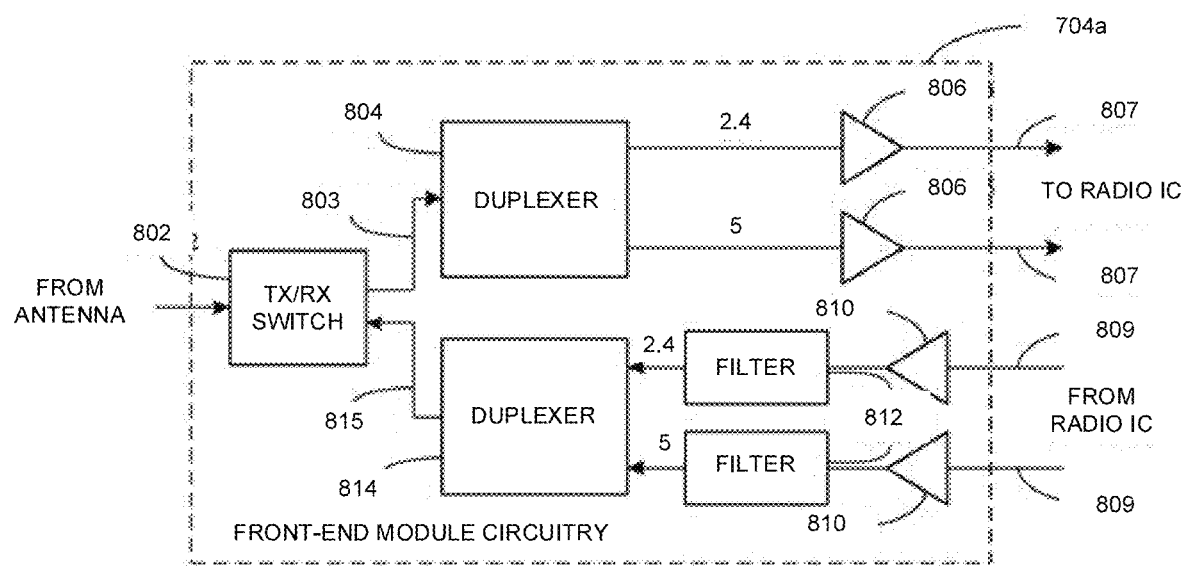
FIG. 8 illustrates WLAN FEM circuitry 704a in accordance with some embodiments.

FIG. 8 illustrates WLAN FEM circuitry 704a in accordance with some embodiments. Although the example of FIG. 8 is described in conjunction with the WLAN FEM circuitry 704a, the example of FIG. 8 may be described in conjunction with the example BT FEM circuitry 704b (FIG. 7), although other circuitry configurations may also be suitable.

In some embodiments, the FEM circuitry 704a may include a TX/RX switch 802 to switch between transmit mode and receive mode operation. The FEM circuitry 704a may include a receive signal path and a transmit signal path. The receive signal path of the FEM circuitry 704a may include a low-noise amplifier (LNA) 806 to amplify received RF signals 803 and provide the amplified received RF signals 807 as an output (e.g., to the radio IC circuitry 706a-b (FIG. 7)). The transmit signal path of the circuitry 704a may include a power amplifier (PA) to amplify input RF signals 809 (e.g., provided by the radio IC circuitry 706a-b), and one or more filters 812, such as band-pass filters (BPFs), low-pass filters (LPFs) or other types of filters, to generate RF signals 815 for subsequent transmission (e.g., by one or more of the antennas 701 (FIG. 7)) via an example duplexer 814.

In some dual-mode embodiments for Wi-Fi communication, the FEM circuitry 704a may be configured to operate in either the 2.4 GHz frequency spectrum or the 5 GHz frequency spectrum. In these embodiments, the receive signal path of the FEM circuitry 704a may include a receive signal path duplexer 804 to separate the signals from each spectrum as well as provide a separate LNA 806 for each spectrum as shown. In these embodiments, the transmit signal path of the FEM circuitry 704a may also include a power amplifier 810 and a filter 812, such as a BPF, an LPF or another type of filter for each frequency spectrum and a transmit signal path duplexer 814 to provide the signals of one of the different spectrums onto a single transmit path for subsequent transmission by the one or more of the antennas 701 (FIG. 7). In some embodiments, BT communications may utilize the 2.4 GHz signal paths and may utilize the same FEM circuitry 704a as the one used for WLAN communications.

Figure 9:
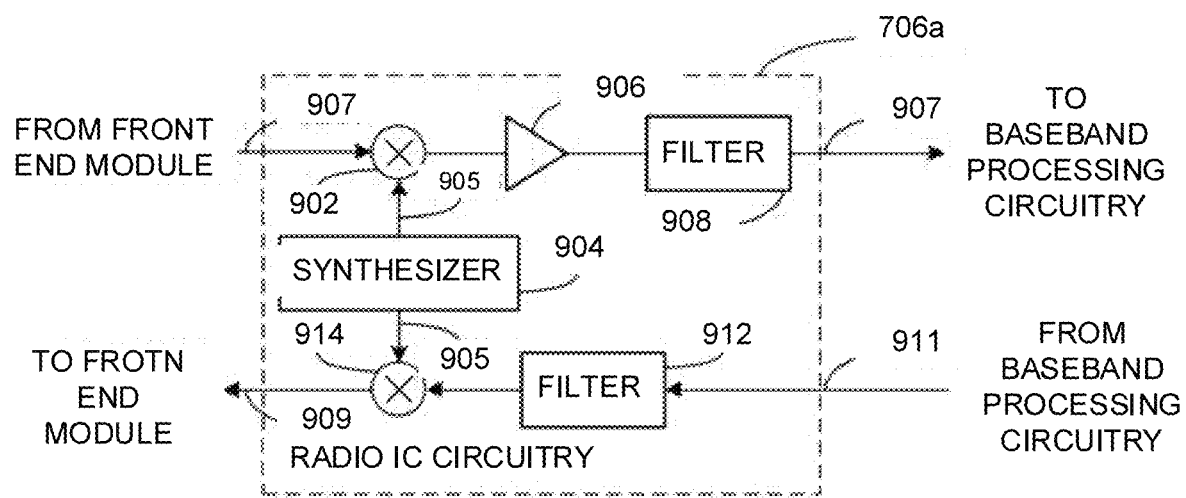
FIG. 9 illustrates radio IC circuitry 706a in accordance with some embodiments.

FIG. 9 illustrates radio IC circuitry 706a in accordance with some embodiments. The radio IC circuitry 706a is one example of circuitry that may be suitable for use as the WLAN or BT radio IC circuitry 706a/706b (FIG. 7), although other circuitry configurations may also be suitable. Alternatively, the example of FIG. 9 may be described in conjunction with the example BT radio IC circuitry 706b.

In some embodiments, the radio IC circuitry 706a may include a receive signal path and a transmit signal path. The receive signal path of the radio IC circuitry 706a may include at least mixer circuitry 902, such as, for example, down-conversion mixer circuitry, amplifier circuitry 906 and filter circuitry 908. The transmit signal path of the radio IC circuitry 706a may include at least filter circuitry 912 and mixer circuitry 914, such as, for example, up-conversion mixer circuitry. Radio IC circuitry 706a may also include synthesizer circuitry 904 for synthesizing a frequency 905 for use by the mixer circuitry 902 and the mixer circuitry 914. The mixer circuitry 902 and/or 914 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 9 illustrates only a simplified version of a radio IC circuitry, and may include, although not shown, embodiments where each of the depicted circuitries may include more than one component. For instance, mixer circuitry 914 may each include one or more mixers, and filter circuitries 908 and/or 912 may each include one or more filters, such as one or more BPFs and/or LPFs according to application needs. For example, when mixer circuitries are of the direct-conversion type, they may each include two or more mixers.

In some embodiments, mixer circuitry 902 may be configured to down-convert RF signals 807 received from the FEM circuitry 704a-b (FIG. 7) based on the synthesized frequency 905 provided by synthesizer circuitry 904. The amplifier circuitry 906 may be configured to amplify the down-converted signals and the filter circuitry 908 may include an LPF configured to remove unwanted signals from the down-converted signals to generate output baseband signals 907. Output baseband signals 907 may be provided to the baseband processing circuitry 708a-b (FIG. 7) for further processing. In some embodiments, the output baseband signals 907 may be zero-frequency baseband signals, although this is not a requirement. In some embodiments, mixer circuitry 902 may comprise passive mixers, although the scope of the embodiments is not limited in this respect.

In some embodiments, the mixer circuitry 914 may be configured to up-convert input baseband signals 911 based on the synthesized frequency 905 provided by the synthesizer circuitry 904 to generate RF output signals 809 for the FEM circuitry 704a-b. The baseband signals 911 may be provided by the baseband processing circuitry 708a-b and may be filtered by filter circuitry 912. The filter circuitry 912 may include an LPF or a BPF, although the scope of the embodiments is not limited in this respect.

In some embodiments, the mixer circuitry 902 and the mixer circuitry 914 may each include two or more mixers and may be arranged for quadrature down-conversion and/or up-conversion respectively with the help of synthesizer 904. In some embodiments, the mixer circuitry 902 and the mixer circuitry 914 may each include two or more mixers each configured for image rejection (e.g., Hartley image rejection). In some embodiments, the mixer circuitry 902 and the mixer circuitry 914 may be arranged for direct down-conversion and/or direct up-conversion, respectively. In some embodiments, the mixer circuitry 902 and the mixer circuitry 914 may be configured for super-heterodyne operation, although this is not a requirement.

Mixer circuitry 902 may comprise, according to one embodiment: quadrature passive mixers (e.g., for the in-phase (I) and quadrature phase (Q) paths). In such an embodiment, RF input signal 807 from FIG. 9 may be down-converted to provide I and Q baseband output signals to be transmitted to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 905 of synthesizer 904 (FIG. 9). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 807 (FIG. 8) may comprise a balanced signal, although the scope of the embodiments is not limited in this respect. The I and Q baseband output signals may be provided to low-noise amplifier, such as amplifier circuitry 906 (FIG. 9) or to filter circuitry 908 (FIG. 9).

In some embodiments, the output baseband signals 907 and the input baseband signals 911 may be analog baseband signals, although the scope of the embodiments is not limited in this respect. In some alternate embodiments, the output baseband signals 907 and the input baseband signals 911 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 904 may be a fractional-N synthesizer or a fractional N/N+1 synthesizer, although the scope of the embodiments is not limited in this respect as other types of frequency synthesizers may be suitable. For example, synthesizer circuitry 904 may be a delta-sigma synthesizer, a frequency multiplier, or a synthesizer comprising a phase-locked loop with a frequency divider. According to some embodiments, the synthesizer circuitry 904 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 904 may be provided by a voltage controlled oscillator (VCO), although that is not a requirement. A divider control input may further be provided by either the baseband processing circuitry 708a-b (FIG. 7) depending on the desired output frequency 905. In some embodiments, a divider control input (e.g., N) may be determined from a look-up table (e.g., within a Wi-Fi card) based on a channel number and a channel center frequency as determined or indicated by the example application processor 710. The application processor 710 may include, or otherwise be connected to, one of the example security signal converter 101 or the example received signal converter 103 (e.g., depending on which device the example radio architecture is implemented in).

In some embodiments, synthesizer circuitry 904 may be configured to generate a carrier frequency as the output frequency 905, while in other embodiments, the output frequency 905 may be a fraction of the carrier frequency (e.g., one-half the carrier frequency, one-third the carrier frequency). In some embodiments, the output frequency 905 may be a LO frequency (fLO).

Figure 10:
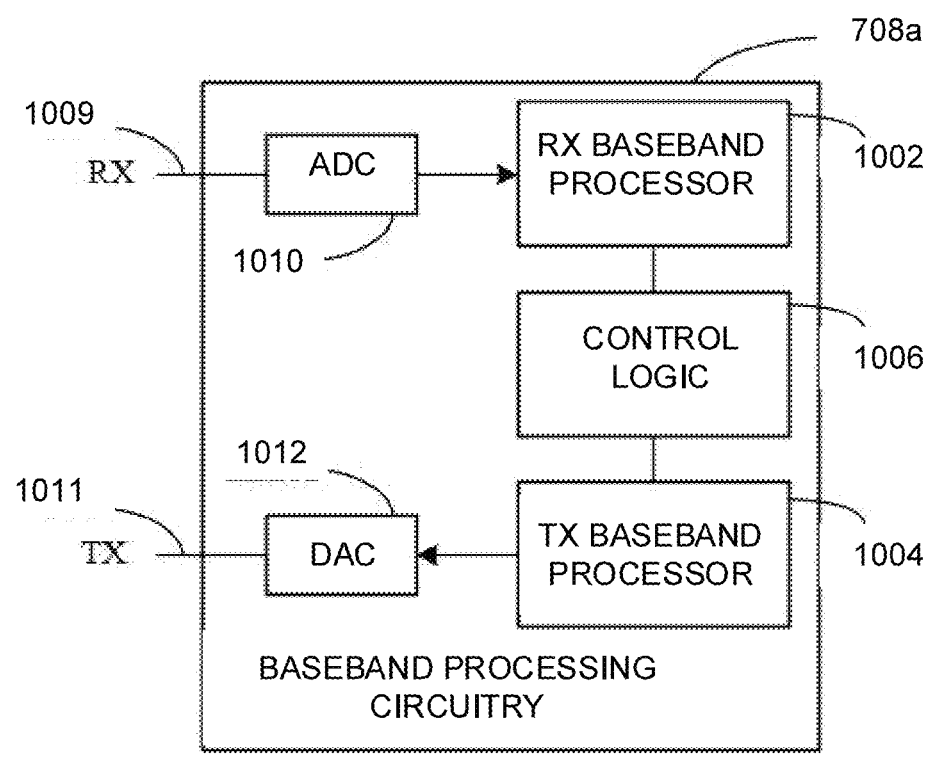
FIG. 10 illustrates a functional block diagram of baseband processing circuitry 708a in accordance with some embodiments.

FIG. 10 illustrates a functional block diagram of baseband processing circuitry 708a in accordance with some embodiments. The baseband processing circuitry 708a is one example of circuitry that may be suitable for use as the baseband processing circuitry 708a (FIG. 7), although other circuitry configurations may also be suitable. Alternatively, the example of FIG. 10 may be used to implement the example BT baseband processing circuitry 708b of FIG. 7.

The baseband processing circuitry 708a may include a receive baseband processor (RX BBP) 1002 for processing receive baseband signals 1009 provided by the radio IC circuitry 706a-b (FIG. 7) and a transmit baseband processor (TX BBP) 1004 for generating transmit baseband signals 1011 for the radio IC circuitry 706a-b. The baseband processing circuitry 708a may also include control logic 1006 for coordinating the operations of the baseband processing circuitry 708a.

In some embodiments (e.g., when analog baseband signals are exchanged between the baseband processing circuitry 708a-b and the radio IC circuitry 706a-b), the baseband processing circuitry 708a may include ADC 1010 to convert analog baseband signals 1009 received from the radio IC circuitry 706a-b to digital baseband signals for processing by the RX BBP 1002. In these embodiments, the baseband processing circuitry 708a may also include DAC 1012 to convert digital baseband signals from the TX BBP 1004 to analog baseband signals 1011.

In some embodiments that communicate OFDM signals or OFDMA signals, such as through baseband processor 708a, the transmit baseband processor 1004 may be configured to generate OFDM or OFDMA signals as appropriate for transmission by performing an inverse fast Fourier transform (IFFT). The receive baseband processor 1002 may be configured to process received OFDM signals or OFDMA signals by performing an FFT. In some embodiments, the receive baseband processor 1002 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 7, in some embodiments, the antennas 701 (FIG. 7) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 701 may each include a set of phased-array antennas, although embodiments are not so limited.

Although the radio architecture 700A, 700B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

FIG. 11 shows a functional diagram of an exemplary communication station 1100, in accordance with one or more example embodiments of the disclosure. In one embodiment, FIG. 11 illustrates a functional block diagram of a communication station that may be suitable for use as the AP 104 (FIG. 1) or the user device 102 (FIG. 1) in accordance with some embodiments. The communication station 1100 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 1100 may include communications circuitry 1102 and a transceiver 1110 for transmitting and receiving signals to and from other communication stations using one or more antennas 1101. The communications circuitry 1102 may include circuitry that can operate the physical layer (PHY) communications and/or medium access control (MAC) communications for controlling access to the wireless medium, and/or any other communications layers for transmitting and receiving signals. The communication station 1100 may also include processing circuitry 1106 and memory 1108 arranged to perform the operations described herein. In some embodiments, the communications circuitry 1102 and the processing circuitry 1106 may be configured to perform operations detailed in the above figures, diagrams, and flows.

In accordance with some embodiments, the communications circuitry 1102 may be arranged to contend for a wireless medium and configure frames or packets for communicating over the wireless medium. The communications circuitry 1102 may be arranged to transmit and receive signals. The communications circuitry 1102 may also include circuitry for modulation/demodulation, upconversion/downconversion, filtering, amplification, etc. In some embodiments, the processing circuitry 1106 of the communication station 1100 may include one or more processors. In other embodiments, two or more antennas 1101 may be coupled to the communications circuitry 1102 arranged for transmitting and receiving signals. The memory 1108 may store information for configuring the processing circuitry 1106 to perform operations for configuring and transmitting message frames and performing the various operations described herein. The memory 1108 may include any type of memory, including non-transitory memory, for storing information in a form readable by a machine (e.g., a computer). For example, the memory 1108 may include a computer-readable storage device, read-only memory (ROM), random-access memory (RAM), magnetic disk storage media, optical storage media, flash-memory devices and other storage devices and media.

In some embodiments, the communication station 1100 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 1100 may include one or more antennas 1101. The antennas 1101 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 1100 may include one or more of a keyboard, a display, a non-volatile memory port, multiple antennas, a graphics processor, an application processor, speakers, and other mobile device elements. The display may be a liquid crystal display (LCD) screen including a touch screen.

Although the communication station 1100 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 1100 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 1100 may include one or more processors and may be configured with instructions stored on a computer-readable storage device.

FIG. 12 illustrates a block diagram of an example of a machine or system 1200 upon which any one or more of the techniques (e.g., methodologies) discussed herein may be performed. In other embodiments, the machine 1200 may operate as a standalone device or may be connected (e.g., networked) to other machines. In a networked deployment, the machine 1200 may operate in the capacity of a server machine, a client machine, or both in server-client network environments. In an example, the machine 1200 may act as a peer machine in peer-to-peer (P2P) (or other distributed) network environments. The machine 1200 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1200 may include a hardware processor 1202 (e.g., a central processing unit (CPU), a graphics processing unit (GPU), a hardware processor core, or any combination thereof), a main memory 1204 and a static memory 1206, some or all of which may communicate with each other via an interlink (e.g., bus) 1208. The machine 1200 may further include a power management device 1232, a graphics display device 1210, an alphanumeric input device 1212 (e.g., a keyboard), and a user interface (UI) navigation device 1214 (e.g., a mouse). In an example, the graphics display device 1210, alphanumeric input device 1212, and UI navigation device 1214 may be a touch screen display. The machine 1200 may additionally include a storage device (i.e., drive unit) 1216, a signal generation device 1218 (e.g., a speaker), a transmit parameter indication device 1219, a network interface device/transceiver 1220 coupled to antenna(s) 1230, and one or more sensors 1228, such as a global positioning system (GPS) sensor, a compass, an accelerometer, or other sensor. The machine 1200 may include an output controller 1234, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the disclosure may be carried out by a baseband processor. The baseband processor may be configured to generate corresponding baseband signals. The baseband processor may further include physical layer (PHY) and medium access control layer (MAC) circuitry, and may further interface with the hardware processor 1202 for generation and processing of the baseband signals and for controlling operations of the main memory 1204, the storage device 1216, and/or the transmit parameter indication device 1219. The baseband processor may be provided on a single radio card, a single chip, or an integrated circuit (IC).

The storage device 1216 may include a machine readable medium 1222 on which is stored one or more sets of data structures or instructions 1224 (e.g., software) embodying or utilized by any one or more of the techniques or functions described herein. The instructions 1224 may also reside, completely or at least partially, within the main memory 1204, within the static memory 1206, or within the hardware processor 1202 during execution thereof by the machine 1200. In an example, one or any combination of the hardware processor 1202, the main memory 1204, the static memory 1206, or the storage device 1216 may constitute machine-readable media.

The transmit parameter indication device 1219 may carry out or perform any of the operations and processes (e.g., methods 400, 500 and 600) described and shown above.

It is understood that the above are only a subset of what the transmit parameter indication device 1219 may be configured to perform and that other functions included throughout this disclosure may also be performed by the transmit parameter indication device 1219.

While the machine-readable medium 1222 is illustrated as a single medium, the term "machine-readable medium" may include a single medium or multiple media (e.g., a centralized or distributed database, and/or associated caches and servers) configured to store the one or more instructions 1224.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1200 and that cause the machine 1200 to perform any one or more of the techniques of the disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1224 may further be transmitted or received over a communications network 1226 using a transmission medium via the network interface device/transceiver 1220 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1220 may include one or more physical jacks (e.g., Ethernet, coaxial, or phone jacks) or one or more antennas to connect to the communications network 1226. In an example, the network interface device/transceiver 1220 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1200 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following paragraphs describe examples of various embodiments.

Example 1 includes an apparatus, comprising: a Radio Frequency (RF) interface; and processor circuitry coupled with the RF interface, wherein the processor circuitry is to: decode an Information Element (IE) received from a Wireless Local Area Network (WLAN) device via the RF interface, wherein the IE is to indicate a transmit parameter for a transmission of a Physical layer Protocol Data Unit (PPDU) of the WLAN device; and perform WLAN sensing on the WLAN device based on the IE.

Example 2 includes the apparatus of Example 1, wherein the IE is carried in an existing management frame or a dedicated management frame.

Example 3 includes the apparatus of Example 1, wherein the processor circuitry is further to: determine, based on the IE, when the transmit parameter of the WLAN device changes; and adapt, when it is determined that the transmit parameter of the WLAN device changes, the WLAN sensing based on the changed transmit parameter.

Example 4 includes the apparatus of Example 1, wherein the transmit parameter includes a Physical Layer (PHY) parameter.

Example 5 includes the apparatus of Example 4, wherein the PHY parameter includes a TXVECTOR value.

Example 6 includes the apparatus of Example 5, wherein the PHY parameter is to indicate: a transmit power level; a number of transmit chains; an antenna used for the transmission; an antenna configuration used for the transmission; a transmit sector combination index; or an application of Cyclic Shift Delay (CSD).

Example 7 includes the apparatus of Example 4, wherein the PHY parameter includes an implementation specific parameter.

Example 8 includes the apparatus of Example 1, wherein the PPDU includes a High Throughput (HT) PPDU, a Very High Throughput (VHT) PPDU, a High Efficiency (HE) PPDU, an Extremely High Throughput (EHT) PPDU, a Directional Multi-Gigabit (DMG) PPDU, or an Enhanced Directional Multi-Gigabit (EDMG) PPDU.

Example 9 includes the apparatus of Example 1, wherein the IE is included in the PPDU, and wherein the PPDU includes a PHY header to indicate that the IE is included in the PPDU.

Example 10 includes the apparatus of Example 1, wherein the IE is further to indicate information related to the WLAN sensing.

Example 11 includes an apparatus, comprising: a Radio Frequency (RF) interface; and processor circuitry coupled with the RF interface, wherein the processor circuitry is to: decode information received from a Wireless Local Area Network (WLAN) device via the RF interface, wherein the information is carried in a dedicated management frame and to indicate a transmit parameter for a transmission of a Physical layer Protocol Data Unit (PPDU) of the WLAN device; and perform WLAN sensing on the WLAN device based on the information.

Example 12 includes the apparatus of Example 11, wherein the PPDU includes the dedicated management frame as a Medium Access Control (MAC) Protocol Data Unit (MPDU) of the PPDU.

Example 13 includes an apparatus, comprising: a Radio Frequency (RF) interface; and processor circuitry coupled with the RF interface, wherein the processor circuitry is to: decode a capability message received from a Wireless Local Area Network (WLAN) device via the RF interface, wherein the capability message is to indicate that the WLAN device supports both of opportunistic/passive sensing and transmission of a WLAN sensing element/frame; encode, in response to the capability message, a WLAN sensing request, for transmission to the WLAN device via the RF interface, to request the WLAN sensing element/frame; decode, in response to the WLAN sensing request, a Physical layer Protocol Data Unit (PPDU) received from the WLAN device via the RF interface to obtain the WLAN sensing element/frame, wherein the WLAN sensing element/frame is to indicate a transmit parameter of the WLAN device for the PPDU; and perform WLAN sensing on the WLAN device based on the transmit parameter.

Example 14 includes the apparatus of Example 13, wherein the apparatus is a part of a non-Access Point (AP) STA.

Example 15 includes the apparatus of Example 13, wherein the WLAN device includes an AP STA or a non-AP STA.

Example 16 includes the apparatus of Example 13, wherein the processor circuitry is further to: determine, based on the WLAN sensing element/frame, when the transmit parameter of the WLAN device changes; and adapt, when it is determined that the transmit parameter of the WLAN device changes, the WLAN sensing based on the changed transmit parameter.

Example 17 includes the apparatus of Example 13, wherein the transmit parameter includes a Physical Layer (PHY) parameter.

Example 18 includes the apparatus of Example 17, wherein the PHY parameter includes a TXVECTOR value.

Example 19 includes the apparatus of Example 18, wherein the PHY parameter is to indicate: a transmit power level; a number of transmit chains; an antenna used for the PPDU; an antenna configuration used for the PPDU; a transmit sector combination index; or an application of Cyclic Shift Delay (CSD).

Example 20 includes the apparatus of Example 18, wherein the PHY parameter includes an implementation specific parameter.

Example 21 includes the apparatus of Example 13, wherein the PPDU includes a High Throughput (HT) PPDU, a Very High Throughput (VHT) PPDU, a High Efficiency (HE) PPDU, an Extremely High Throughput (EHT) PPDU, a Directional Multi-Gigabit (DMG) PPDU, or an Enhanced Directional Multi-Gigabit (EDMG) PPDU.

Example 22 includes the apparatus of Example 13, wherein the PPDU includes a PHY header to indicate that the WLAN sensing element/frame is included in the PPDU.

Example 23 includes the apparatus of Example 13, wherein the WLAN sensing element/frame is further to indicate information related to the WLAN sensing.

Example 24 includes a method, comprising: decoding an Information Element (IE) received from a Wireless Local Area Network (WLAN) device, wherein the IE is to indicate a transmit parameter for a transmission of a Physical layer Protocol Data Unit (PPDU) of the WLAN device; and performing WLAN sensing on the WLAN device based on the IE.

Example 25 includes the method of Example 24, wherein the IE is carried in an existing management frame or a dedicated management frame.

Example 26 includes the method of Example 24, further comprising: determining, based on the IE, when the transmit parameter of the WLAN device changes; and adapting, when it is determined that the transmit parameter of the WLAN device changes, the WLAN sensing based on the changed transmit parameter.

Example 27 includes the method of Example 24, wherein the transmit parameter includes a Physical Layer (PHY) parameter.

Example 28 includes the method of Example 27, wherein the PHY parameter includes a TXVECTOR value.

Example 29 includes the method of Example 28, wherein the PHY parameter is to indicate: a transmit power level; a number of transmit chains; an antenna used for the transmission; an antenna configuration used for the transmission; a transmit sector combination index; or an application of Cyclic Shift Delay (CSD).

Example 30 includes the method of Example 27, wherein the PHY parameter includes an implementation specific parameter.

Example 31 includes the method of Example 24, wherein the PPDU includes a High Throughput (HT) PPDU, a Very High Throughput (VHT) PPDU, a High Efficiency (HE) PPDU, an Extremely High Throughput (EHT) PPDU, a Directional Multi-Gigabit (DMG) PPDU, or an Enhanced Directional Multi-Gigabit (EDMG) PPDU.

Example 32 includes the method of Example 24, wherein the IE is included in the PPDU, and wherein the PPDU includes a PHY header to indicate that the IE is included in the PPDU.

Example 33 includes the method of Example 24, wherein the IE is further to indicate information related to the WLAN sensing.

Example 34 includes a method, comprising: decoding information received from a Wireless Local Area Network (WLAN) device, wherein the information is carried in a dedicated management frame and to indicate a transmit parameter for a transmission of a Physical layer Protocol Data Unit (PPDU) of the WLAN device; and performing WLAN sensing on the WLAN device based on the information.

Example 35 includes the method of Example 34, wherein the PPDU includes the dedicated management frame as a Medium Access Control (MAC) Protocol Data Unit (MPDU) of the PPDU.

Example 36 includes a method, comprising: decoding a capability message received from a Wireless Local Area Network (WLAN) device, wherein the capability message is to indicate that the WLAN device supports both of opportunistic/passive sensing and transmission of a WLAN sensing element/frame; encoding, in response to the capability message, a WLAN sensing request, for transmission to the WLAN device, to request the WLAN sensing element/frame; decoding, in response to the WLAN sensing request, a Physical layer Protocol Data Unit (PPDU) received from the WLAN device to obtain the WLAN sensing element/frame, wherein the WLAN sensing element/frame is to indicate a transmit parameter of the WLAN device for the PPDU; and performing WLAN sensing on the WLAN device based on the transmit parameter.

Example 37 includes the method of Example 36, wherein the method is performed by a non-Access Point (AP) STA.

Example 38 includes the method of Example 36, wherein the WLAN device includes an AP STA or a non-AP STA.

Example 39 includes the method of Example 36, further comprising: determining, based on the WLAN sensing element/frame, when the transmit parameter of the WLAN device changes; and adapting, when it is determined that the transmit parameter of the WLAN device changes, the WLAN sensing based on the changed transmit parameter.

Example 40 includes the method of Example 36, wherein the transmit parameter includes a Physical Layer (PHY) parameter.

Example 41 includes the method of Example 40, wherein the PHY parameter includes a TXVECTOR value.

Example 42 includes the method of Example 41, wherein the PHY parameter is to indicate: a transmit power level; a number of transmit chains; an antenna used for the PPDU; an antenna configuration used for the PPDU; a transmit sector combination index; or an application of Cyclic Shift Delay (CSD).

Example 43 includes the method of Example 41, wherein the PHY parameter includes an implementation specific parameter.

Example 44 includes the method of Example 36, wherein the PPDU includes a High Throughput (HT) PPDU, a Very High Throughput (VHT) PPDU, a High Efficiency (HE) PPDU, an Extremely High Throughput (EHT) PPDU, a Directional Multi-Gigabit (DMG) PPDU, or an Enhanced Directional Multi-Gigabit (EDMG) PPDU.

Example 45 includes the method of Example 36, wherein the PPDU includes a PHY header to indicate that the WLAN sensing element/frame is included in the PPDU.

Example 46 includes the method of Example 36, wherein the WLAN sensing element/frame is further to indicate information related to the WLAN sensing.

Example 47 includes an apparatus, comprising: means for decoding an Information Element (IE) received from a Wireless Local Area Network (WLAN) device, wherein the IE is to indicate a transmit parameter for a transmission of a Physical layer Protocol Data Unit (PPDU) of the WLAN device; and means for performing WLAN sensing on the WLAN device based on the IE.

Example 48 includes the apparatus of Example 47, wherein the IE is carried in an existing management frame or a dedicated management frame.

Example 49 includes the apparatus of Example 47, further comprising: means for determining, based on the IE, when the transmit parameter of the WLAN device changes; and means for adapting, when it is determined that the transmit parameter of the WLAN device changes, the WLAN sensing based on the changed transmit parameter.

Example 50 includes the apparatus of Example 47, wherein the transmit parameter includes a Physical Layer (PHY) parameter.

Example 51 includes the apparatus of Example 50, wherein the PHY parameter includes a TXVECTOR value.

Example 52 includes the apparatus of Example 51, wherein the PHY parameter is to indicate: a transmit power level; a number of transmit chains; an antenna used for the transmission; an antenna configuration used for the transmission; a transmit sector combination index; or an application of Cyclic Shift Delay (CSD).

Example 53 includes the apparatus of Example 50, wherein the PHY parameter includes an implementation specific parameter.

Example 54 includes the apparatus of Example 47, wherein the PPDU includes a High Throughput (HT) PPDU, a Very High Throughput (VHT) PPDU, a High Efficiency (HE) PPDU, an Extremely High Throughput (EHT) PPDU, a Directional Multi-Gigabit (DMG) PPDU, or an Enhanced Directional Multi-Gigabit (EDMG) PPDU.

Example 55 includes the apparatus of Example 47, wherein the IE is included in the PPDU, and wherein the PPDU includes a PHY header to indicate that the IE is included in the PPDU.

Example 56 includes the apparatus of Example 47, wherein the IE is further to indicate information related to the WLAN sensing.

Example 57 includes an apparatus, comprising: means for decoding information received from a Wireless Local Area Network (WLAN) device, wherein the information is carried in a dedicated management frame and to indicate a transmit parameter for a transmission of a Physical layer Protocol Data Unit (PPDU) of the WLAN device; and means for performing WLAN sensing on the WLAN device based on the information.

Example 58 includes the apparatus of Example 57, wherein the PPDU includes the dedicated management frame as a Medium Access Control (MAC) Protocol Data Unit (MPDU) of the PPDU.

Example 59 includes an apparatus, comprising: means for decoding a capability message received from a Wireless Local Area Network (WLAN) device, wherein the capability message is to indicate that the WLAN device supports both of opportunistic/passive sensing and transmission of a WLAN sensing element/frame; means for encoding, in response to the capability message, a WLAN sensing request, for transmission to the WLAN device, to request the WLAN sensing element/frame; means for decoding, in response to the WLAN sensing request, a Physical layer Protocol Data Unit (PPDU) received from the WLAN device to obtain the WLAN sensing element/frame, wherein the WLAN sensing element/frame is to indicate a transmit parameter of the WLAN device for the PPDU; and means for performing WLAN sensing on the WLAN device based on the transmit parameter.

Example 60 includes the apparatus of Example 59, wherein the apparatus is a part of a non-Access Point (AP) STA.

Example 61 includes the apparatus of Example 59, wherein the WLAN device includes an AP STA or a non-AP STA.

Example 62 includes the apparatus of Example 59, further comprising: means for determining, based on the WLAN sensing element/frame, when the transmit parameter of the WLAN device changes; and means for adapting, when it is determined that the transmit parameter of the WLAN device changes, the WLAN sensing based on the changed transmit parameter.

Example 63 includes the apparatus of Example 59, wherein the transmit parameter includes a Physical Layer (PHY) parameter.

Example 64 includes the apparatus of Example 63, wherein the PHY parameter includes a TXVECTOR value.

Example 65 includes the apparatus of Example 64, wherein the PHY parameter is to indicate: a transmit power level; a number of transmit chains; an antenna used for the PPDU; an antenna configuration used for the PPDU; a transmit sector combination index; or an application of Cyclic Shift Delay (CSD).

Example 66 includes the apparatus of Example 64, wherein the PHY parameter includes an implementation specific parameter.

Example 67 includes the apparatus of Example 59, wherein the PPDU includes a High Throughput (HT) PPDU, a Very High Throughput (VHT) PPDU, a High Efficiency (HE) PPDU, an Extremely High Throughput (EHT) PPDU, a Directional Multi-Gigabit (DMG) PPDU, or an Enhanced Directional Multi-Gigabit (EDMG) PPDU.

Example 68 includes the apparatus of Example 59, wherein the PPDU includes a PHY header to indicate that the WLAN sensing element/frame is included in the PPDU.

Example 69 includes the apparatus of Example 59, wherein the WLAN sensing element/frame is further to indicate information related to the WLAN sensing.

Example 70 includes a computer-readable medium having instructions stored thereon, the instructions when executed by processor circuitry cause the processor circuitry to perform the method of any of Examples 24 to 46.

Example 71 includes a Wireless Fidelity (Wi-Fi) device as shown and described in the description.

Example 72 includes a method performed at a Wireless Fidelity (Wi-Fi) device as shown and described in the description.

Although certain embodiments have been illustrated and described herein for purposes of description, a wide variety of alternate and/or equivalent embodiments or implementations calculated to achieve the same purposes may be substituted for the embodiments shown and described without departing from the scope of the disclosure. This application is intended to cover any adaptations or variations of the embodiments discussed herein. Therefore, it is manifestly intended that embodiments described herein be limited only by the appended claims and the equivalents thereof.

What is claimed is:

1. An apparatus, comprising:
a Radio Frequency (RF) interface; and
processor circuitry coupled with the RF interface,
wherein the processor circuitry is to:
receive a frame from a Wireless Local Area Network (WLAN) device via the RF interface;
decode the frame to determine parameters used for an WLAN sensing operation of the WLAN device based on an element of the frame;
cause the WLAN sensing operation to be performed based on the parameters;
determine, based on the element, when the parameters used for the WLAN sensing operation changes; and
adapt, when it is determined that the parameters used for the WLAN sensing operation changes, the WLAN sensing operation based on the changed parameters.

2. The apparatus of claim 1, wherein the frame is a management frame.

3. The apparatus of claim 1, wherein the WLAN device is a non-access point (non-AP) station (STA), and the frame is a probe request frame.

4. The apparatus of claim 1, wherein the element comprises a field indicating an antenna configuration for the WLAN sensing.

5. The apparatus of claim 4, wherein the antenna configuration comprises a number of antennas that can be used for the WLAN sensing.

6. The apparatus of claim 1, wherein the processor circuitry is further to:
determine a capability of the WLAN device to perform passive sensing based on another element of the frame.

7. The apparatus of claim 6, wherein the processor circuitry is further to:
receive a Physical layer Protocol Data Unit (PPDU) that is not intended for WLAN sensing; and
obtain measurements based on sensing of the PPDUs.

8. A computer-readable medium having instructions stored thereon, the instructions when executed by processor circuitry cause the processor circuitry to:
receive a frame from a Wireless Local Area Network (WLAN) device via the RF interface;
decode the frame to determine parameters used for an WLAN sensing operation of the WLAN device based on an element of the frame;
cause the WLAN sensing operation to be performed based on the parameters;
determine, based on the element, when the parameters used for the WLAN sensing operation changes; and adapt, when it is determined that the parameters used for the WLAN sensing operation changes, the WLAN sensing operation based on the changed parameters.

9. The computer-readable medium of claim 8, wherein the frame is a management frame.

10. The computer-readable medium of claim 8, wherein the WLAN device is a non-access point (non-AP) station (STA), and the frame is a probe request frame.

11. The computer-readable medium of claim 8, wherein the element comprises a field indicating an antenna configuration for the WLAN sensing.

12. The computer-readable medium of claim 11, wherein the antenna configuration comprises a number of antennas that can be used for the WLAN sensing.

13. The computer-readable medium of claim 8, wherein the instructions when executed by processor circuitry further cause the processor circuitry to:
   determine a capability of the WLAN device to perform passive sensing based on another element of the frame.

14. The computer-readable medium of claim 13, wherein the instructions when executed by processor circuitry further cause the processor circuitry to:
   receive a Physical layer Protocol Data Unit (PPDU) that is not intended for WLAN sensing; and
   obtain measurements based on sensing of the PPDUs.

* * * * *